Nov. 18, 1947.  E. M. SMITH  2,431,281

CONTROL APPARATUS

Filed March 14, 1945

*INVENTOR.*
EDGAR M. SMITH
BY
*C. B. Spangenberg*
ATTORNEY.

Patented Nov. 18, 1947

2,431,281

UNITED STATES PATENT OFFICE 2,431,281

CONTROL APPARATUS

Edgar M. Smith, Trenton, N. J., assignor to The Brown Instrument Company, Philadelphia, Pa., a corporation of Pennsylvania Application March 14, 1945, Serial No. 582,690

4 Claims. (Cl. 236—69)

1

The general object of the present invention is to provide improved apparatus for effecting control operations in accordance with variations in the current flow in an electric circuit.

A more specific object of the invention is to provide a control circuit arrangement of the kind including separable contacts and characterized by its provisions for minimizing both the current flow through said contacts and the voltage tending to produce arcing at the contacts when the latter are separated.

A further specific object of the invention is to provide a control system with novel means insuring that when the system fails as a result of a controlling thermocouple burnout or the development of some other defect, the system will "fail safely." Thus if the control system regulates the supply of heat to a heater, the "safe" failure of the system will interrupt the supply of heat to the heater.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Figure 1:
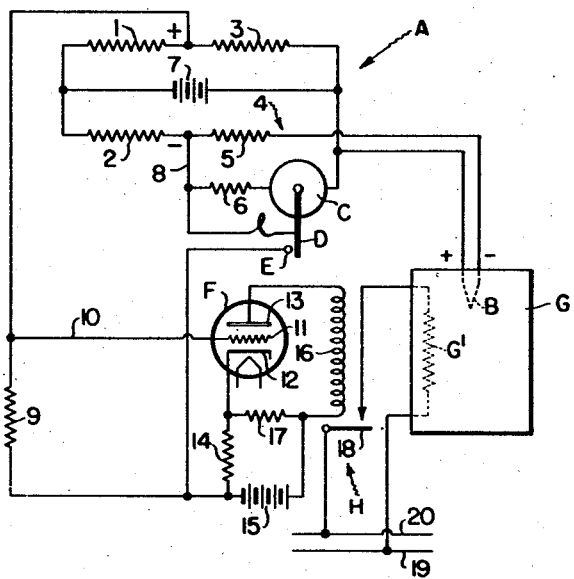
Fig. 1 is a diagrammatic representation of the use of the present invention in controlling the supply of heat to a heater.

In the simple form of the invention diagrammatically illustrated in Fig. 1, the control circuit comprises a bridge A including a device B responsive to a controlling condition and shown as a thermocouple, a current responsive device C shown as a galvanometer, separable contacts comprising a galvanometer pointer D and a stationary contact E, and a controlled device G shown as an electric furnace to which the supply of heat is cut off or diminished when the furnace temperature exceeds a predetermined value. In the usual arrangement of the character shown diagrammatically in Fig. 1, the thermocouple B has its hot junction within the heater G. In the preferred form of the invention shown in Fig. 1 variations in the current flow through the circuit branch including the contacts D and E are amplified by an electronic element F which may be a thyratron but which

2 is shown as a simple triode tube. Variations in the plate current of the element F actuate a control device H to vary the heating current supplied to the heating coil G' of the heater G.

The bridge A shown in Fig. 1 has its arms 1, 2 and 3 formed by fixed resistances, and includes in its remaining arm 4, the condition responsive element B and a resistance 5 and in parallel therewith the current responsive device C and a resistance 6. The bridge A is energized by a battery 7 having one terminal connected to the junction of the bridge arms 1 and 2 and having its other terminal connected to the junction of the bridge arms 3 and 4. The resistances 6 and 5, shown diagrammatically in Fig. 1, respectively represent, or constitute, the internal resistance of the measuring circuit branch including the device C, and the external resistance of the thermocouple circuit branch including the resistance of the thermocouple and its extension leads.

The resistance values of the bridge arms 1, 2 and 3 are so proportioned relative to one another and to the values of the resistances 5 and 6, that when the thermocouple B is operatively connected in parallel with the galvanometer C in the bridge arm 4 as shown in Fig. 1, the junction between the bridge arms 1 and 3 and the junction of the bridge arms 2 and 4 will have the relative plus and minus polarities indicated in Fig. 1, whereas when the thermocouple burns out and is thus not operatively connected in bridge arm 4, the polarities of the last mentioned junctions will be reversed or reduced to-zero.

As shown in Fig. 1, the junction of the bridge arms 2 and 4 is connected by a conductor 8 to the galvanometer pointer D and the junction of the bridge arms 1 and 3 is connected through a resistance 9 to the stationary contact E. The terminal of the resistance 9 adjacent the bridge is connected by a conductor 10 to the grid element 11 of the tube F. The terminal of the resistance 9 adjacent the contact E is connected to the cathode 12 of the tube F through a resistance 14. The latter forms a part of the plate circuit connecting the anode 13 of the tube F to the cathode 12. Said plate circuit as shown includes a battery or other source of current 15 and the winding 16 of device H in series with one another and with the resistance 14 between the cathode 12 and the anode 13.

The plate circuit also includes a resistance 17 forming a shunt about the resistance 14 and current source 15. The resistances 14 and 17 are provided to make the cathode 12 positive relative to the grid 11 when an increase in the temperature of the thermocouple B causes the galvanometer C to deflect to the high side of its normal or control point position and thus open the signal or control circuit branch including the contacts D and E and resistance 9. That circuit branch when closed normally serves to maintain the potential of the grid 11 positive or less negative relative to the potential of the cathode 12.

As diagrammatically shown, the control device H is a simple electromagnetic relay. When the relay winding 16 is suitably energized it attracts the relay armature 18. The latter forms the movable element of a switch and when attracted said switch connects the heating resistor G' of the heater G to current supply conductors 19 and 20.

In operation, the electromotive force of the thermocouple B increases and decreases as the heater temperature increases and decreases, and thereby increases and decreases the current flow through the galvanometer C. When the increase in current flow through the galvanometer C is sufficient to cause the galvanometer to deflect to the high side of its normal or control point position, the galvanometer pointer D separates from the stationary contact E and thus opens the control circuit branch of the bridge circuit network including the resistance 9. The resultant interruption of current flow through resistance 9 eliminates the positive potential bias on the grid 11 previously produced by the current flow through and potential drop in the resistance 9. The change in the relative potentials of the grid 11 and cathode 12 thus produced, reduces the anode current flow through the winding 16 of the device H and allows the armature 18 to move into its switch open position and thereby interrupt the current flow through the heater resistor G'.

If the thermocouple B burns out or a break occurs anywhere in the circuit branch which includes the thermocouple and resistance 5 and is connected in parallel with the galvanometer C and resistance 6, the current flow through the galvanometer C and resistance 6 will diminish and the potential at the junction of bridge arms 2 and 4 will increase relative to the potential at the junction of bridge arms 1 and 3. As previously explained, the bridge resistances should be so proportioned that the failure of the thermocouple circuit branch will reverse or reduce to zero the junction potential difference indicated by plus and minus signs in Fig. 1. The effect of the described change in relative junction potentials, is to make the potential of the grid negative, or zero, relative to the potential of the cathode 12, thereby reducing the current in the plate circuit of the tube sufficiently to deenergize the relay or control device H. Thus, relay H will then be maintained deenergized regardless of whether contacts D and E engage or not.

This interrupts the supply of heating current to the furnace G, and thus constitutes a "safe" failure of the control system. The system will fail safely, also, as a result of failure of either of the current sources 7 and 15 to provide sufficient current. The system will also fail safely when interposed dirt prevents the normally closed contacts D and E from passing sufficient current to make the tube F adequately conductive. Whether the bridge circuit resistances are desirably arranged so as to reverse the polarities of the bridge junctions to which the contacts D and E are directly connected, or so that those junctions are advantageously brought to the same potential under the condition resulting in the separation of the contacts D and E, depends upon the characteristics of the electronic tube F employed.

In lieu of the simple on and off control relay 18 shown in Fig. 1, the latter may be replaced by a control element adapted to produce a proportional or throttling control effect as the value of the controlling condition varies and correspondingly varies the relative potentials of the bridge junctions to which the contacts D and E are connected.

In the simple form shown in Fig. 1, the energizing elements 7 and 15 are sources of direct current. However, sources of alternating current of a normal power frequency of 25 or 60 cycles or so, can be used in lieu of the batteries 7 and 15, without influence upon the calibration of the measuring element C provided both sources of alternating current are of the same phase. Sources of alternating current of the same phase and of a frequency of 500 or more cycles per second may be also used in lieu of the batteries 7 and 15, and in such case the measuring element C may be of a type which is different from a simple D'Arsonval galvanometer and may well be of the so called conversion type. One form of conversion type responsive element suitable for use in accordance with the present invention is disclosed in the application for patent of Walter P. Wills, Serial No. 421,173, filed December 1, 1941, which issued as Patent No. 2,423,540 on July 8, 1947.

Figure 2:
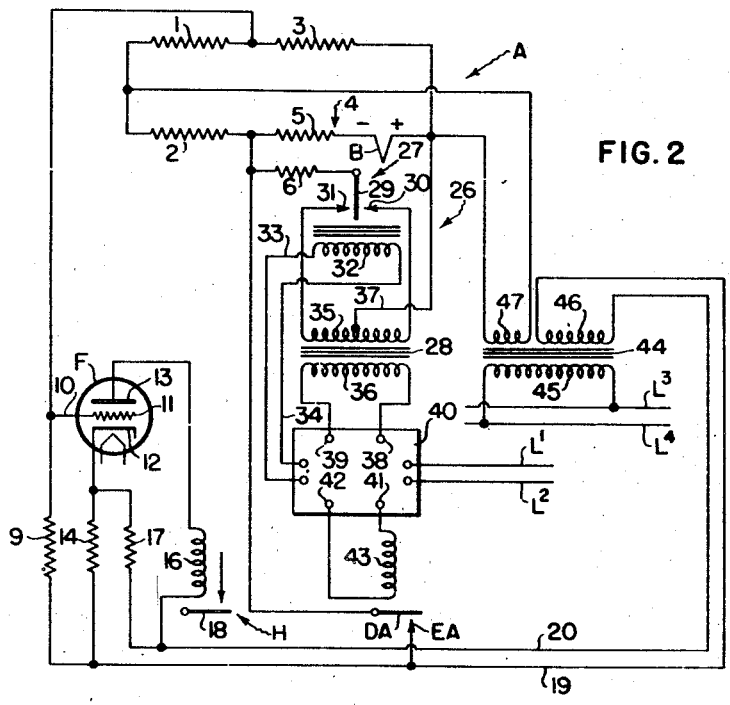
Fig. 2 illustrates a modification of a portion of the apparatus shown in Fig. 1.

In Fig. 2, I have shown a portion of a control system in which the galvanometer C of Fig. 1 is replaced by a conversion type element 26 of the kind shown in said Wills patent.

The element 26 includes an interrupting switch 27 and a transformer 28. The interrupting switch 27 comprises a vibrating reed 29 and a pair of relatively stationary contacts 30 and 31 and also comprises an operating coil 32 for vibrating the reed 29 into and out of engagement with the contacts 30 and 31. The operating coil 32 is supplied with alternating current through conductors 33 and 34 from a suitable source. The latter may be the secondary winding of a stepdown transformer which is not shown but is included in an electronic amplifier 40 and which comprises a line voltage primary winding the terminals of which are connected to alternating current supply conductors $L^1$ and $L^2$. The conductors $L^1$ and $L^2$ may supply alternating current of commercial frequency, namely 25 cycle or 60 cycle current, or they may supply alternating current of the higher frequencies included above.

The transformer 28 includes a center tapped primary winding 35 and a secondary winding 36. One end terminal of the primary winding 35 is connected to the contact 30 and the other end terminal of the winding is connected to the contact 31. The vibrating reed 29 of the interrupter 27 is shown connected to the terminal of the resistance 6 of the bridge arm 4 in which the galvanometer C is connected in Fig. 1, and the junction of the bridge arms 3 and 4 is connected by a conductor 37 to the center-tap on the transformer primary winding 35. When the vibrating reed 29 is in engagement with the contact 30, the right half of the primary winding 35 is operatively connected in the bridge circuit and when the vibrating reed 29 is in engagement with the contact 31 the left half of the primary winding 35 is operatively connected in that circuit.

Since the operating coil 32 of the interrupter 27 is energized from the alternating current supply conductors L¹ and L², the vibrating reed 29 is vibrated in synchronism with the alternating current supplied by the supply mains L¹ and L², and therefore, the right and left halves of the transformer primary winding 35 are adapted to be alternately connected in the bridge circuit in synchronism with the alternating current supplied by the supply conductors L¹ and L². For purposes of explanation, it may be assumed that contact 30 of the interrupter 27 is engaged by the vibrating reed 29 during the odd half cycles of the alternating current supplied by the supply mains L¹ and L², and that the other contact 31 is engaged by the vibrating reed 29 during the even half cycles of that alternating current. As is explained in Patent No. 2,423,540 referred to above, when the vibrating reed 29 is in its mid position it engages both of the contacts 30 and 31, and consequently the reed is alternately in operative engagement with one or the other of the contacts 30 and 31, and is never out of engagement with both contacts.

The alternating voltage generated in the transformer secondary winding 36 is impressed on the input terminals 38 and 39 of the amplifier 40. The amplifier output terminals 41 and 42 supply energizing current to the relay winding 43. When the value of that current is not less than a suitable predetermined value, the winding 43 attracts an armature switch member DA and lifts the latter out of engagement with a stationary contact EA. The member DA and contact EA are connected into the control system as are the pointer D and contact E, respectively, of Fig. 1, and serve the same purpose.

As shown in Fig. 2, alternating current having a frequency of 500 cycles per second is supplied to the primary winding 45 of a transformer 44 having two secondary windings 46 and 47 from an alternating current supply source connected to the primary winding 45 by conductors L³ and L⁴. Thus, the alternating currents produced in the secondary windings 46 and 47 are in phase. The secondary winding 46 replaces the battery 15 of Fig. 1, as a source of current in the plate circuit of the tube F. The secondary winding 47 is adapted to replace the battery 7 of Fig. 1, as a source of energizing current for the bridge A.

In respect to the present invention, the general operation of the system illustrated in Fig. 2 is essentially the same as that of the system shown in Fig. 1. In each figure the regulating means includes electronic amplifying means directly responsive to variations in the voltage drop in the impedance 9. The variations in the temperature of the thermocouple B and a rupture of the thermocouple circuit branch produce significant variations in the current flow through the circuit branch, including the impedance 9, and hence in the voltage drop in impedance 9, in Fig. 2 as in Fig. 1. Variations in current flow through the resistance 6 and vibrating contact 29 are amplified and transmitted to the relay winding 43 of Fig. 2, and the varying intensity of energization of the latter controls the separation and engagement of the contact switch elements DA and EA just as the varying energization of the galvanometer C of Fig. 1 controls the separation and engagement of the contacts D and E. The system shown in Fig. 2 will fail safely under the same conditions which cause the system in Fig. 1 to fail safely.

The resistance values of the bridge arms 1, 2 and 3 are so proportioned relatively to one another and to the values of the resistances 5 and 6 that when the thermocouple B is operatively connected in parallel with the element 26 in the bridge arm 4, the bridge A is unbalanced in the proper direction to cause an alternating current of 500 cycles per second to be impressed across the resistance 9 when the contacts DA and EA are in engagement with one another. The alternating voltage so produced across resistance 9 is of the proper phase relatively to the alternating voltage of 500 cycles per second impressed on the anode circuit of tube F to cause the negative potential on the control grid 11 to be reduced as required to render the tube F conductive. The relay H will then be energized and effect connection of a furnace heating resistor G' to current supply conductors 19 and 20, as shown in Fig. 1, for example.

When the contacts DA and EA are separated, due to the normal operation of the converter 26, amplifier 40 and relay 43, in response to a change in the voltage of thermocouple B, the tube F will be rendered non-conductive by virtue of the action of a biasing voltage produced across the resistor 14 by alternating current having a frequency of 500 cycles per second and derived from the transformer secondary winding 46. This alternating voltage produced across resistor 14 is of the proper phase and amplitude required to render tube F non-conductive and thereby to deenergize the relay H.

Upon burn-out or breakage of the thermocouple circuit, the voltage of 500 cycles per second impressed across the resistor 9 by the bridge A when the contacts DA and EA are in engagement will either diminish to zero or will be of the opposite phase relatively to the alternating voltage impressed on the anode circuit of the tube F. Accordingly, the tube F will be rendered non-conductive to deenergize the relay H regardless of whether the contacts DA and EA are in engagement or are separated. As a result, if the energizing circuit to the furnace heating resistor G' had been closed when the thermocouple burn-out or breakage occurred, the current flow through the furnace heater resistor G' will be interrupted. Accordingly, the system of Fig. 2 will fail safely upon thermocouple burn-out or breakage, just as does the system of Fig. 1.

While in accordance with the provisions of the statutes, I have illustrated and described the best forms of embodiments of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. In a control system, the combination of a current responsive device, a device responsive to a controlling condition, resistances connected to said devices to form the four arms of a bridge circuit with said devices connected in parallel in one of said arms, a source of energizing current connected to opposing junctions of said bridge circuit, a control circuit branch connecting the other two junctions of said bridge circuit, the resistances in said arms being proportioned so as to give one of the last mentioned junctions a potential higher than that of the other of said two junctions when both of said devices are operative to pass current, and so as to eliminate or reverse said potential difference when said condition responsive device becomes inoperative, and regulating means responsive to variations in the current flow in said circuit branch.

2. In a control system, the combination of a current responsive device, a device responsive to a controlling condition, resistances connected to said devices to form the four arms of a bridge circuit with said devices connected in parallel in one of said arms, a source of energizing current connected to opposing junctions of said bridge circuit, a control circuit branch connecting the other two junctions of said bridge circuit and including a resistance and separable contacts, the resistances in said arms being proportioned so as to give one of the junctions a potential higher than that of the other of said two junctions when both of said devices are operative to pass current and so as to eliminate or reverse said potential difference when said condition responsive device becomes inoperative, electronic amplifying means including a control grid, plate, cathode and plate circuit means comprising a relay winding, the terminals of said resistance respectively adjacent to and remote from said bridge being connected to said grid and cathode respectively, and regulating means responsive to variations in the current flow in said plate circuit.

3. In a control system, the combination of a current responsive device, a device responsive to a controlling condition, resistances connected to said devices to form the four arms of a bridge circuit with said devices connected in parallel in one of said arms, a source of energizing current connected to opposing junctions of said bridge circuit, a control circuit branch connecting the other two junctions of said bridge circuit and including a resistance and separable contacts, means actuated by the current flow through the first mentioned device for opening said control circuit branch when said current flow falls below a predetermined minimum, the resistances in said arms being proportioned so as to give one of the junctions a potential higher than that of the other of said two junctions when both of said devices are operative to pass current and so as to eliminate or reverse said potential difference when said condition responsive device becomes inoperative, electronic amplifying means including a control grid, plate, cathode and plate circuit means comprising a relay winding, the terminals of said resistance respectively adjacent to and remote from said bridge being connected to said grid and cathode respectively, and regulating means responsive to variations in the current flow through said relay winding.

4. In a control system, the combination of a current responsive device, a device responsive to a controlling condition, resistances connected to said devices to form the four arms of a bridge circuit with said devices connected in parallel in one of said arms, a source of energizing current connected to opposing junctions of said bridge circuit, a control circuit branch connecting the other two junctions of said bridge circuit and including an impedance, the resistances in said arms being proportioned so as to give one of the last mentioned junctions a potential higher than that of the other of said two junctions when both of said devices are operative to pass current and so as to eliminate or reverse said potential difference when said condition responsive device becomes inoperative and regulating means including an electronic amplifier responsive to variations in the potential drop in said impedance.

EDGAR M. SMITH.

REFERENCES CITED

The following references are of record in the file of this patent:

UNITED STATES PATENTS

| Number | Name | Date |
|---|---|---|
| 2,153,222 | Wunsch | Apr. 4, 1939 |

FOREIGN PATENTS

| Number | Country | Date |
|---|---|---|
| 495,061 | Great Britain | Nov. 7, 1938 |